US008150475B2

(12) United States Patent
Gilmore, II et al.

(10) Patent No.: US 8,150,475 B2
(45) Date of Patent: Apr. 3, 2012

(54) METHOD FOR INFORMATION SIGNAL DISTRIBUTION BETWEEN COMMUNICATION DEVICES BASED ON OPERATING CHARACTERISTICS OF A DEPLETABLE POWER SUPPLY USED BY ONE OF THE DEVICES

(75) Inventors: Edward L. Gilmore, II, Sunrise, FL (US); Hariprasad Janardana Iyer, Plantation, FL (US); Jose E. Korneluk, Lake Worth, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1442 days.

(21) Appl. No.: 11/641,627

(22) Filed: Dec. 19, 2006

(65) Prior Publication Data
US 2008/0146292 A1 Jun. 19, 2008

(51) Int. Cl.
*H04M 1/00* (2006.01)
(52) U.S. Cl. ...................... 455/572; 455/41.2; 455/127.1
(58) Field of Classification Search ................. 455/41.2, 455/127.1, 127.5, 343.1, 343.5, 572
See application file for complete search history.

(56) References Cited

U.S. PATENT DOCUMENTS

| 6,944,474 B2 * | 9/2005 | Rader et al. ................. 455/550.1 |
| 2006/0135218 A1 * | 6/2006 | Son et al. ....................... 455/573 |
| 2006/0209884 A1 * | 9/2006 | MacMullan et al. ........... 370/465 |

* cited by examiner

Primary Examiner — Curtis Kuntz
Assistant Examiner — Yosef K Laekemariam (57) ABSTRACT

A method for managing information signal distribution in a communication system (100) includes transmitting a signal containing information configured according to a first media format from a first communication device (104) to a second communication device (110). At least one of the two devices (104, 110) monitors at least one operating characteristic of a depletable power supply (318) sourcing electrical energy for the second device (110). When a level of the monitored operating characteristic falls below a predetermined threshold, the first communication device (104) outputs the information to the second communication device (110) according to a second media format that requires less power consumption to process than does the first media format. Alternatively, under such circumstances, the first communication device (104) may output the information to a media output device other than the second communication device (110).

21 Claims, 6 Drawing Sheets

METHOD FOR INFORMATION SIGNAL DISTRIBUTION BETWEEN COMMUNICATION DEVICES BASED ON OPERATING CHARACTERISTICS OF A DEPLETABLE POWER SUPPLY USED BY ONE OF THE DEVICES

FIELD OF THE INVENTION

The present invention relates generally to the field of communication systems and more particularly to a method for information signal distribution between communication devices in a communication system based on an operating characteristic level of a depletable power supply (e.g., battery) used by one of the communication devices.

BACKGROUND OF THE INVENTION

Bluetooth® technology allows for, inter alia, wireless control of and communication between a mobile telephone and a headset/handsfree unit. A Bluetooth headset or earpiece allows a mobile phone user to have a telephone conversation without actually having to open or hold the mobile phone. Additionally, many mobile phones today have the capability to play stored or streamed audio and video, such as MP3 files, via the mobile phone speaker or the wireless headset. The streamed or stored media can likewise be communicated to a headset or earpiece using Bluetooth technology.

The Bluetooth audio output devices include their own batteries and are otherwise independent of the portable devices supplying the audio information to them. As a result, the battery life of a Bluetooth audio device has no correlation with the battery life of the mobile phone or other source of the audio stream. However, the rate of power consumption by the Bluetooth audio device is dependent upon the format of the audio being received and processed by it.

The Bluetooth protocol supports both asynchronous and synchronous communications. A synchronous link is referred to as a synchronous connection-oriented (SCO) link. An asynchronous link is referred to as an asynchronous connectionless (ACL) link. The Bluetooth Hands Free Profile (HF) uses the SCO link to carry a mono, pulse code modulated (PCM) audio channel. The Bluetooth Advanced Audio Distribution Profile (A2DP) defines the protocols and procedures for distributing high-quality audio content in mono or stereo on ACL channels.

The mobile phone and Bluetooth audio device each contain transmitter and receiver circuitry to communicate. The mobile phone transmits audio information to the Bluetooth device encoded in data packets. The quality of the audio communicated using the A2DP stereo format is considerably better than that of audio sent in the HF mode. Using the A2DP stereo format, more information defining the audio signal is encoded within the data packets transferred. Therefore, the audio information packets are longer in the A2DP mode.

The transmitter and/or receiver circuitry of both the mobile phone and the Bluetooth audio output device is turned off when it is not needed (e.g., between packets or when no information is scheduled for transmission) in order to conserve battery power. Because the packets for the A2DP stereo format are longer than the packets for the HF format, the transmitters of the mobile phones and the receivers of the Bluetooth audio output devices are on longer. Additionally, the processors and any decoding/encoding circuitry require more processing power to handle stereo A2DP packets than HF packets. Therefore, the stereo A2DP connection consumes significantly more battery power than does a mono HF connection.

For example, the Motorola HT820 stereo headphones support both listening to stereo music and conducting phone calls. Assuming the headphones' battery is fully charged, talk time for such headphones, when using the HF format, is approximately seventeen (17) hours, whereas, listening time, when using the A2DP stereo format for music, is reduced to only twelve (12) hours. In a second example, the Logitech HS210 headphones provide ten (10) hours of talk time, but only eight (8) hours of music time.

As evident from the foregoing examples, the battery life of a Bluetooth audio device is reduced at differing rates depending on how the wireless headset is used (talk vs. music), or which format (HF, A2DP mono, or A2DP stereo) is used. Additionally, if the battery level of the Bluetooth audio output device is low, continuing to use the A2DP stereo format instead of the HF mono format will decrease the battery level of the device at a faster rate.

Wireless phones and other media sourcing devices are typically equipped to automatically re-route the audio output in the event that the link to the Bluetooth device goes down or at least degrades below a pre-established threshold. For example, if the Bluetooth link dies while the user is in a phone call, listening to music, or in the middle of receiving a call indication, the audio is automatically re-routed to an alternate destination (usually back to the handset), so that the user can continue the current activity. Consider, for example, a user talking in a phone call using a Bluetooth headset. If the headset battery dies, resulting in Bluetooth link failure, the audio may be suddenly re-routed to the handset, presenting a situation that can be quite unexpected and confusing to the user. If the user does not realize what has happened quickly, he/she may think the call has been prematurely disconnected. Thus, audio re-routing responsive to Bluetooth link failure is a reactionary philosophy because no action takes place until after the problem has occurred. Nothing is presently done in anticipation of the Bluetooth audio device battery dying in order to prevent or at least mitigate user discontent.

Therefore, a need exists for a method for managing information signal distribution between communication devices (e.g., between a mobile phone and a Bluetooth audio output device) that proactively monitors operating characteristics of at least the hands-free device and takes preventive audio transmission or routing action to thereby overcome the shortcomings of the prior art.

SUMMARY

Generally, the present invention encompasses a method and apparatus for managing information signal distribution in a communication system that includes a first communication device and a second communication device, wherein the second communication device is powered from a depletable power supply (e.g., a battery, a hydrogen fuel cell, or a solar cell). In accordance with one embodiment of the method, at least one wireless signal configured according to a first media format is transmitted from the first communication device to the second communication device. During the period of communication between the two communication devices, a level of at least one operating characteristic (e.g., output power, voltage, current, energy, discharge rate, etc.) of the second device's depletable power supply is monitored. In the event that the level of the monitored operating characteristic has degraded below a predetermined threshold, the information for inclusion in a wireless signal or another signal (e.g., wired) is outputted from the first communication device according to a second media format.

In an alternative embodiment, at least a second wireless signal is transmitted from the first communication device to the second device in the event that the level of the monitored operating characteristic has degraded below a predetermined threshold, wherein the second wireless signal includes information configured according to the second media format.

In another alternative embodiment, the first communication device includes a battery and a battery level for the first communication device is monitored. In the event that the battery level for the first communication device has degraded below a second predetermined threshold, the information for inclusion in a wireless signal or another signal (e.g., wired) is outputted from the first communication device according to the second media format.

In another embodiment, the information from the first communication device is outputted to a media output device other than the second communication device according to the second media format. The media output device may form part of the first communication device or may be a separate device, such as a wireless headset, a wireless earpiece, a wireless video monitor, or a wireless speaker.

In yet another embodiment, the first media format may be a Bluetooth Advanced Audio Distribution Profile (A2DP) stereo format, and the second media format may be a Bluetooth Synchronous Connection Oriented (SCO) mono format.

In a further embodiment, at least one wireless signal including media information (e.g., audio or video information) is transmitted from a first communication device to a second communication device. During the period of communication between the two communication devices, a level of at least one operating characteristic (e.g., output power, voltage, current, energy, etc.) of the second device's depletable power supply is monitored. The information from the first communication device is outputted to a media output device other than the second communication device in the event that the level of the monitored operating characteristic degrades below a predetermined threshold. The media output device may form part of the first communication device or may be a separate device, such as a wireless headset, a wireless speaker, a wireless earpiece, a wireless automobile adapter, a mobile telephone speaker, a mobile telephone audio jack, a mobile telephone earpiece, a mobile telephone accessory connector, an automobile video display headrest, a video conferencing terminal, a wireless video monitor, a wired video monitor, a computer system, a television, a personal digital assistant (PDA), a wireless email device, or a portable gaming device including a built-in wireless modem.

In an alternative embodiment, a user of the first communication device is notified haptically (e.g., through vibration of a tactile alert) in the event that the level of the monitored operating characteristic degrades below the predetermined threshold.

In another embodiment, the media output device is selected according to a priority listing. For example, in one embodiment, the user of the first communication device is prompted to enter a media output device preference. Upon receipt of the media output device preference from the user, the information from the first communication device is outputted to the media output device based on the media output device preference.

In an alternative embodiment, in the event that the first communication device is engaged in a phone call, the phone call is placed on hold and the user of the first communication device is notified by the first communication device (e.g., visually, audibly, haptically or otherwise) that the level of the monitored operating characteristic of the second wireless communication device is less than the predetermined threshold. After issuing such notification, the first communication device resumes the phone call using the media output device. Further, the use of the second communication device is optionally prohibited until the level of the monitored operating characteristic of the second wireless device meets or exceeds the predetermined threshold.

In another embodiment, information signals are distributed in a communication system that includes a first communication device and a second communication device, wherein the second communication device is powered from a depletable power supply. At least one wireless signal including information configured according to a first media format is received from the first communication device by the second communication device. The information is output at the second communication device according to the first media format. During the period of communication between the two communication devices, a level of at least one operating characteristic of the second device's depletable power supply is monitored. In the event that the level of a monitored operating characteristic has degraded below a predetermined threshold, a level indicator for the monitored operating characteristic is transmitted to the first communication device. Thereafter, the second communication device receives information from the first communication device according to a second media format. The second communication device outputs the information according to the second media format. The level indicator may be transmitted when the level of the monitored operating characteristic has degraded to a level that is less than the predetermined threshold or at predetermined intervals regardless of the level of the monitored operating characteristic.

DETAILED DESCRIPTION

Before describing in detail exemplary embodiments that are in accordance with the present invention, it should be observed that the embodiments reside primarily in combinations of apparatus components and processing steps related to managing information signal distribution in a communication system that includes a first communication device and a second communication device, wherein the second communication device is powered from a depletable power supply. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

As used herein and in the appended claims, the term "communication device" is intended to broadly cover many different types of devices that can receive signals, and optionally can transmit signals, and may also operate in a communication system. For example, and not by way of limitation, a communication device may be or include the functionality of any one or more of the following: a cellular telephone, a mobile phone, a smart phone, a two-way radio, a two-way pager, a wireless messaging device, a laptop or personal computer, a wireless automotive gateway, a wireless or wired residential gateway, a wireless or wired router, a wireless headset, a wireless earpiece, a wireless speaker, a video monitor or terminal, a television, a set top box, a data terminal, a video conferencing terminal, a personal digital assistant (PDA), a wireless email device, a portable gaming device including a built-in wireless modem, and the like.

It will be appreciated that embodiments of the invention described herein may be comprised of one or more conventional processors and unique stored program instructions that control the one or more processors to implement, in conjunction with certain non-processor circuits, some, most, or all of the functions of managing information signal distribution in a communication system as described herein. The non-processor circuits may include, but are not limited to, a radio receiver, a radio transmitter, signal drivers, clock circuits, power source circuits, and user input devices. As such, these functions may be interpreted as steps of a method to distribute information signals between communication devices in a communication system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) without undue experimentation.

Many people use a wireless headset or wireless earpiece, such as those headsets enabled using Bluetooth® technology, in conjunction with their wireless phones for the convenience of being able use their hands while having a phone conversation, or more recently, to listen to music. However, the battery levels of the wireless headset and the mobile phone do not correlate. Generally, when the battery level of the wireless headset reaches a point where the device no longer functions, the audio signal is suddenly transferred back to the mobile phone earpiece. One embodiment of the present invention uses the battery level information of a wireless headset to make an informed decision about where to route the audio and which audio format to use in a wireless communication system.

Figure 1:
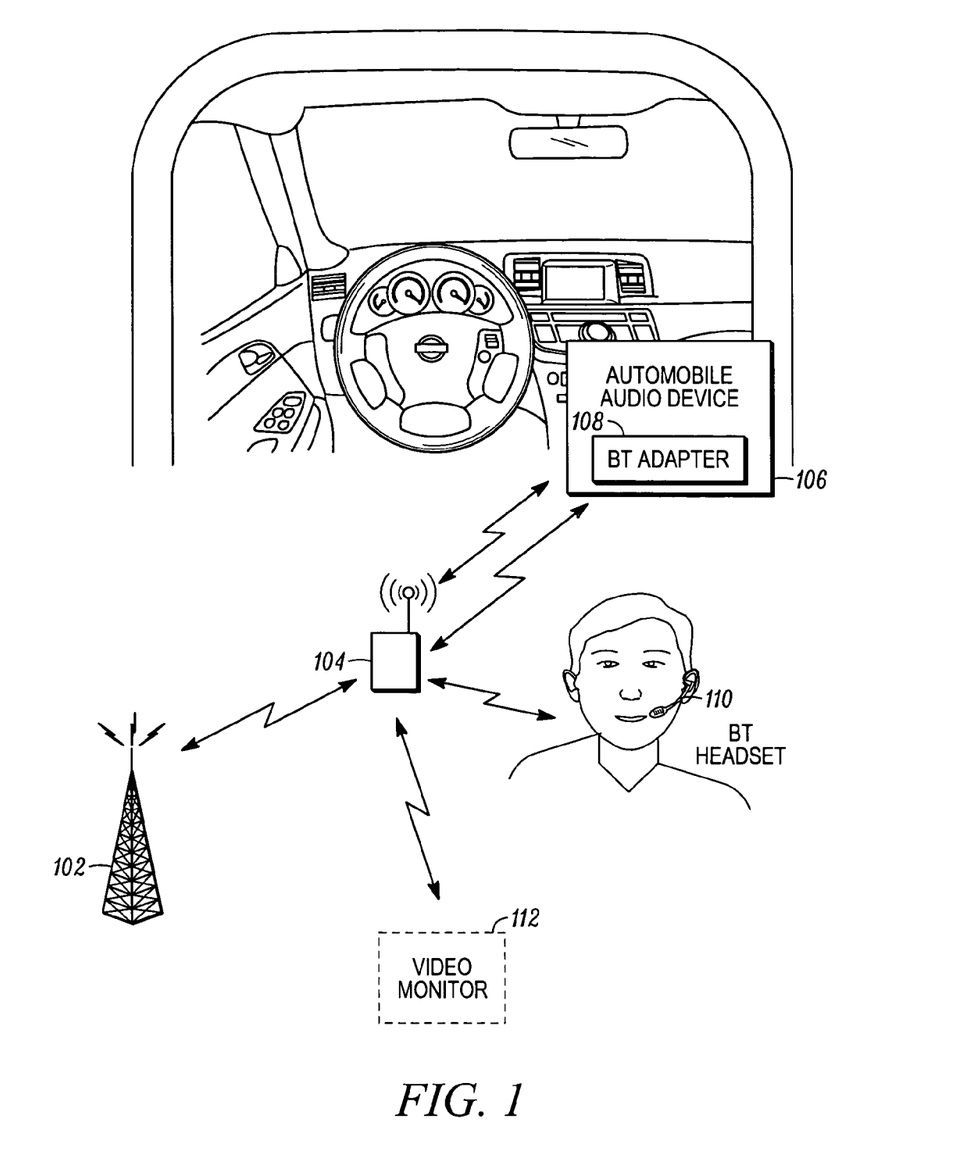
FIG. 1 is a block diagram of an exemplary communication system in accordance with one embodiment of the present invention.

The present invention can be more readily understood with reference to FIGS. 1-6, in which like reference numerals designate like items. FIG. 1 depicts an exemplary communication system 100 in accordance with one embodiment of the present invention. The exemplary communication system 100 connects one communication device (e.g., wireless communication device 104) to one or more other communication devices (e.g., wireless communication devices 106, 110, 112) and/or to one or more networks, such as a wireless telecommunications network, the Internet, a public switched-phone network, and the like, via one or more base stations 102 (one shown), access points, routers, gateways, or other intermediary device(s). In one embodiment, the communication system100 is a wireless communication system that includes, inter alia, a mobile phone network, a mobile text messaging device network, and/or a mobile data network. For purposes of illustrating the various features of the present invention, but not by way of limitation, the discussion below focuses primarily on the operation of a wireless communication system, although the present invention may also be implemented in a wired system or a combination of a wired and a wireless system. In accordance with a preferred embodiment of the present invention, wireless communication device 104 has the ability to communicate with some wireless communication devices directly (e.g., one for more of wireless devices 110, 106, and 112), without routing information through a base station 102.

The communications standard or protocol of the wireless communication system 100 for use between wireless communication device 104 and a base station 102 may be any conventional protocol or multiple access technique, including, without limitation, Code Division Multiple Access (CDMA), Time Division Multiple Access (TDMA), Global System for Mobile Communications (GSM), Enhanced Data GSM Environment (EDGE), General Packet Radio Service (GPRS), Frequency Division Multiple Access (FDMA), and/or Orthogonal Frequency Division Multiplexing (OFDM). Additionally, the wireless communication system 100 may further utilize text messaging standards, such as, Short Message Service (SMS), Enhanced Messaging Service (EMS), Multimedia Messaging Service (MMS), or any other future developed standard or proprietary data transmission protocol, to communicate textual data between wireless communication device 104 and a base station 102. The wireless communications system 100 may further allow for push-to-talk over cellular communications between capable wireless communication devices.

The wireless communication system 100 supports any number of wireless communication devices 104 and/or wireline communication devices (e.g., PCs). In one embodiment, the wireless communication system 100 supports mobile telephones, smart phones, text messaging devices, handheld computers, pagers, beepers, wireless communication cards, or the like. A smart phone is a mobile telephone that has additional application processing capabilities. For example, in one embodiment, a smart phone 124 is a combination of 1) a pocket PC, handheld PC, palm top PC, or PDA, and 2) a mobile telephone.

The wireless communication device 104 may communicate directly with a variety of audio devices capable of conveying audio information to and receiving audio information from the wireless communication device 104. Such audio devices include, but are not limited to, a wireless earpiece or headset 110 and an automobile audio device 106 having both a wired interface (not shown) and a wireless adapter 108. In the exemplary communication system 100 of FIG. 1, the wireless communication device 104 transmits audio to the wireless audio device (e.g., the wireless headset 110 and/or the wireless automobile adapter 108) using the Bluetooth® short-range transmission protocol. In an alternative embodiment, the exchange of audio between the wireless communication device 104 and the wireless audio device may be performed using any other known or future-developed short-range wireless protocol.

In an alternative embodiment, the wireless communication device 104 may also convey video information to a wireless video monitor 112. Additionally, the wireless communication device 104 may be connected to a variety of input sources for receiving audio and/or video information, including both wired and wireless implementations, such as a satellite, a cable television signal, and a public switched telephone network.

Figure 2:
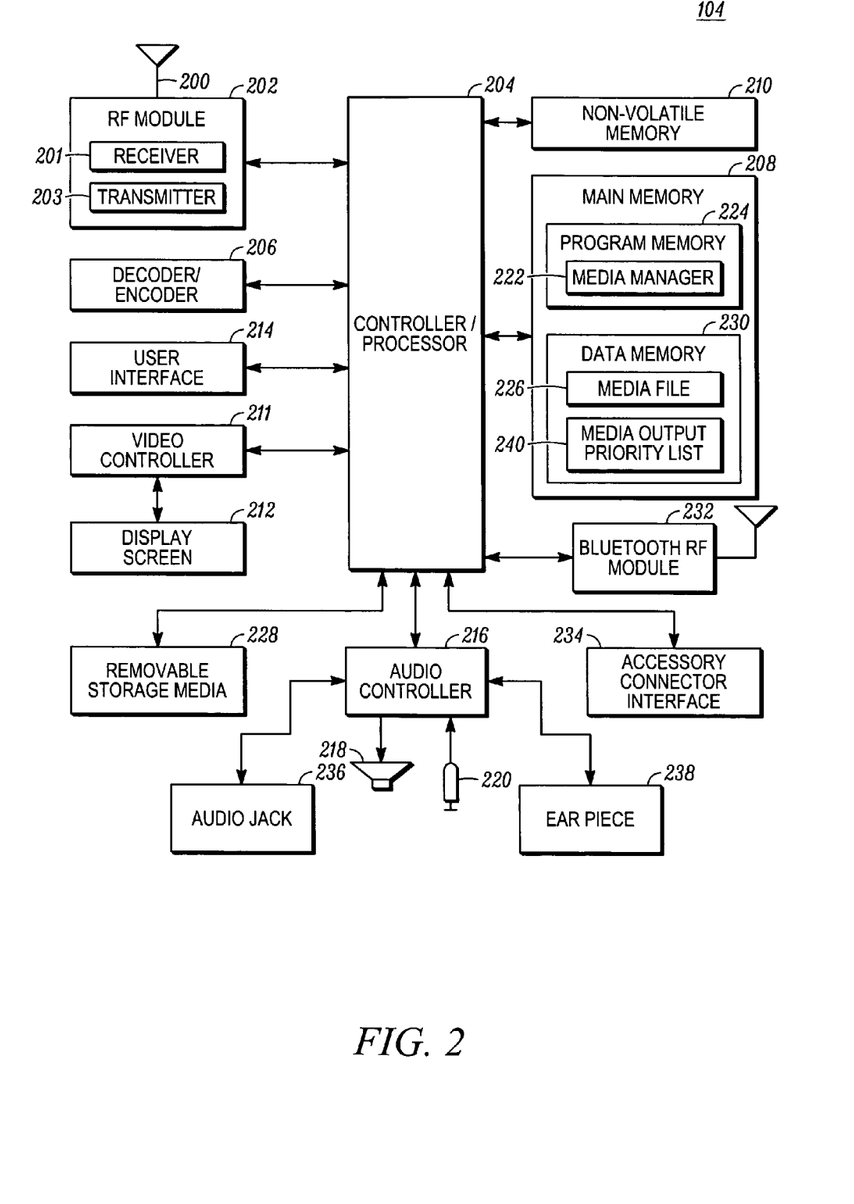
FIG. 2 is a block diagram illustrating one wireless communication device of the system of FIG. 1 according to an exemplary embodiment of the present invention.

Referring now to FIG. 2, an electrical block diagram of wireless communication device 104 is shown in more detail according to one embodiment of the present invention. The wireless communication device 104 includes a controller/processor 204, which controls the operation of the wireless device according to computer instructions stored in program memory 224. The wireless communication device 104 also includes a non-volatile memory 210 and a main memory 208. In one embodiment, the main memory 208 includes the program memory 224 and a data memory 230. A media manager 222, which is discussed in greater detail below, is contained in the program memory 224. The data memory 230 may contain a plurality of media files 226, which may include encoded audio and/or video information. Additionally, or alternatively, the media files 226 may be stored in or on a removable storage media 228 (e.g., a subscriber identity module (SIM) card, a memory stick, a USB flash drive, or any other portable data storage device), which also functions under the command of the controller/processor 204.

The wireless communication device 104 transmits and receives signals for enabling wireless communication, such as for a cellular telephone, in a well-known manner. For example, when the wireless communication device 104 is in a "receive" mode, the controller/processor 204 operates an RF module 202, which couples an RF signal from the antenna 200 to a receiver 201 in a well known manner. The receiver 201 receives, converts, and demodulates the RF signal, providing a stream of data to the decoder/encoder module 206. The decoder/encoder module 206 decodes the received data, which the controller/processor 204 outputs to a user in a manner prescribed by the media manager 222. For example, audio signals are routed through an audio controller 216 to a variety of output devices within or otherwise forming part of the wireless communication device 104, such as a speaker 218, an earpiece 238, or an audio jack 236 for an externally connectable earpiece. Additionally, audio signals may be routed to an external device, such as the automobile audio device 106 or a personal computer (not shown) via an accessory connector interface 234. Alternatively, audio information can be transmitted wirelessly to a wireless audio device, such as a headset 110 or automobile adapter 108 through a Bluetooth or other short-range wireless transceiver module 232.

Additionally, received textual and/or video data is routed through the video controller 211 and presented to the user on a display screen 212. Alternatively, video information can be transmitted wirelessly to a wireless video monitor 112 or other wireless video device, such as Bluetooth-enabled automobile video display headrest, video conferencing terminal, computer system, set top box, or television through the Bluetooth RF module 232. A receive operational sequence is normally under the control of the controller/processor 204 operating in accordance with computer instructions stored in program memory 224, in a well-known manner.

In a "transmit" mode, the controller/processor 204 (e.g., responding to a user input, such as a user selecting a contact from a contact list using a user interface 214) controls the audio circuits 216 and couples electronic audio signals from an audio transducer of a microphone 220 to the decoder/encoder module 206, where the audio signals are converted to an encoded data stream for transmission. Alternatively, in a "receive mode," audio signals are received from an external audio device via the accessory connector interface 234 or wirelessly via the Bluetooth RF module 232. The controller/processor 204 enables the transmitter circuit 203, which modulates the encoded data onto an RF carrier signal, couples the signal through the antenna 200, and transmits the signal through the wireless communication network 100 in a manner well-known in the art.

Figure 3:
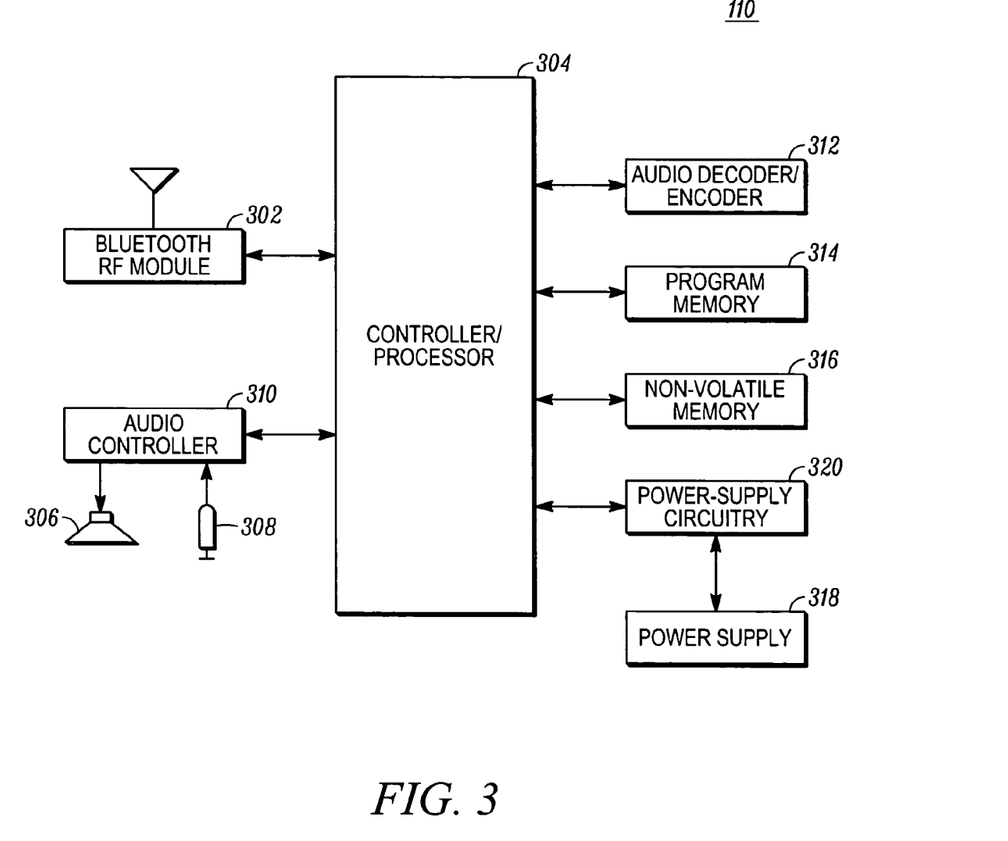
FIG. 3 is a block diagram illustrating another wireless communication device of the system of FIG. 1 according to an exemplary embodiment of the present invention.

FIG. 3 depicts an electrical block diagram of an exemplary audio output communication device 110 in accordance with one embodiment of the present invention. In this embodiment, the communication device 110 is a wireless headset or earpiece. The communication device 110 includes a controller/processor 304, which controls the operation of the communication device 110 according to computer instructions stored in program memory 314. The communication device 110 receives wireless data signals containing encoded audio information via a Bluetooth RF or other short-range wireless transceiver module 302. The audio information is decoded by the audio decoder/encoder 312 in a manner well-known to those skilled in the art, and stored temporarily in non-volatile memory 316 before being routed to an audio controller 310 and output via a speaker 306. Likewise, audio signals coupled from a microphone 308 are transferred to the controller/processor 304 by the audio controller 310, and then encoded by the audio decoder/encoder 312 for transmission to the wireless communication device 104 by the Bluetooth RF module 302.

In an exemplary embodiment, communication device 110 is powered by a depletable power supply 318, characteristics of which are monitored by power supply monitoring circuitry 320. The depletable power supply 318 may be a battery, a hydrogen fuel cell, a solar cell, or any other power supply consuming a depletable fuel source.

Figure 4:
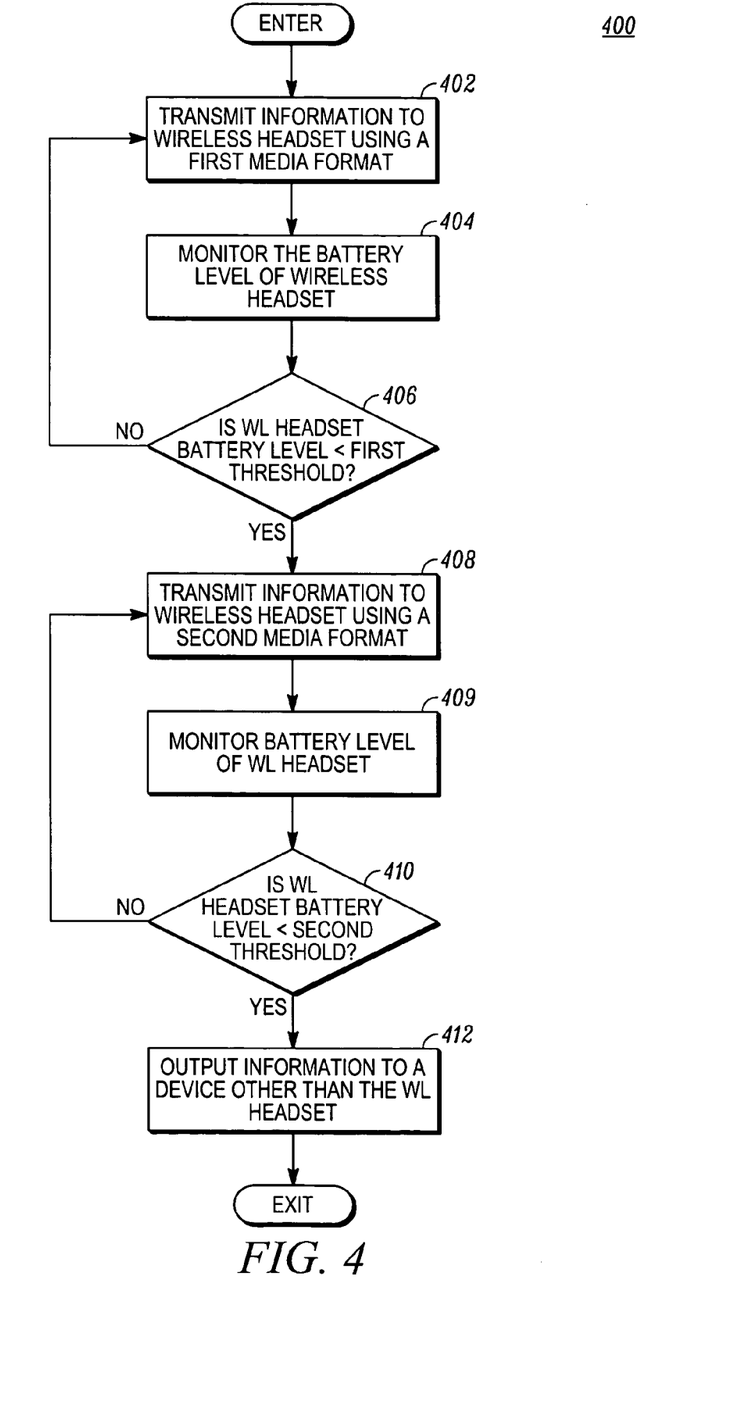
FIG. 4 is a logic flow diagram illustrating a method for managing information signal distribution in a communication system in accordance with one exemplary embodiment of the present invention.

FIG. 4 illustrates an exemplary operational flow diagram 400 for a method of managing information signal distribution in a communication system 100, in accordance with one embodiment of the present invention. The method of FIG. 4 operates from the perspective of a first communication device 104 (e.g., a mobile phone handset or video conferencing terminal, etc.). Beginning at step 402, a first communication device (e.g., wireless communication device 104) transmits a wireless signal containing information encoded according to a first media format to a second communication device (e.g., wireless communication device 110). In one exemplary embodiment, the first communication device 104 is a mobile telephone and the second communication device 110 is a Bluetooth-enabled wireless headset; however, in alternative embodiments, other destination devices, such as a wireless earpiece, a wireless speaker, and/or a wireless video monitor, may be used to implement the second communication device. In FIG. 4, the second communication device 110 is identified as the wireless headset or WL headset in reference to this exemplary embodiment. The media format, in one embodiment, is the Bluetooth A2DP stereo format; however, any high quality audio or video encoding format may be alternatively used. Using the A2DP stereo format, more information concerning the audio signal is contained within the encoded data than if, for example, a mono SCO format is used. Therefore, the data or information packets are longer for the A2DP format, requiring more decoding/encoding power and longer "on-time" for the transmitter/receiver circuits. The longer operational time depletes the second communication device's depletable power supply 318 (e.g., battery) quicker.

At step 404, the battery voltage level or some other operating characteristic of the second communication device's depletable power supply 318 is monitored by the power supply circuitry 320. Information relating to the monitored characteristic (e.g., a level indicator) can be transmitted to the first communication device 104 for monitoring by the first communication device 104 in accordance with the method disclosed in U.S. Patent Publication No. 2006/0135218, entitled "Method for Indicating a Battery Charge Level of a Wireless Headset" and filed Dec. 1, 2005, the entire contents of which are hereby incorporated by this reference as if fully set forth herein. For example, either data representing the monitored characteristic (e.g., an actual battery voltage, current, or discharge rate) or an indication that the monitored characteristic has fallen below a predetermined threshold may be transmitted. In the event that data representing the monitored characteristic is transmitted, the data may be transmitted at predetermined intervals to enable the first communication device 104 to determine approximately when the level of the monitored operating characteristic of the second communication device's power supply 318 fell below the predetermined threshold. On the other hand, if only an indication that the monitored characteristic has fallen below a predetermined threshold is transmitted, the power supply monitoring circuitry 320 of the second communication device 110 determines the degraded power supply condition prior to transmitting the indicator.

While the foregoing discussion has focused on the monitoring of battery characteristics, any operating characteristic of the depletable power supply 318 may be monitored in an alternative embodiment. Applicable operating characteristics include, but are not limited to, a voltage level, a current level, a power level, a fuel supply level (e.g., where the depletable power supply is a fuel cell), or a stored energy level.

Next, at step 406, as long as the battery voltage level or a level of another operating characteristic of the second communication device's power supply 318 is above an associated predetermined level, the first communication device 104 continues to transmit information to the second communication device 110 according to the first media format (e.g., the Bluetooth A2DP format). However, if the battery or other operating characteristic level falls below its predetermined threshold, the media manager 222 of the first communication device 104 changes media formats and, at step 408, the first wireless communication device 104 transmits subsequent information to the second wireless communication device 110 using a second media format. The second media format preferably requires less power to be consumed by the second communication device's power supply than does the first media format (e.g., use of the Bluetooth SCO mono format results in less power consumption than does use of the Bluetooth A2DP stereo format). In this manner, the operational time period of the second communication device's power supply 318, without recharging or refueling, is extended beyond the time period of operation that would be expected if only the initial media format was used throughout the duration of the communication between the communication devices 104, 110. Monitoring the battery or other operating characteristic level of a power supply (not shown) of the first communication device 104 and switching output media formats when such level falls below a predetermined threshold is also within the scope of the present invention. In other words, in the case where both communication devices 104, 110 operate from respective depletable power supplies, the first communication device 104 may monitor the operating characteristics of its own supply as well as one or more operating characteristics of the second communication device's supply and then change output media formats in order to conserve power in the event that the operating characteristics (e.g., battery voltage) of either supply has degraded beyond a respective predetermined level.

Referring back to FIG. 4, at step 409, the first communication device 104 continues to monitor the power supply level of the second communication device 110, as discussed above. In another optional embodiment, as long as the power supply level of the second communication device 110 is above a second predetermined level, the first communication device 104 continues to transmit information to the second communication device 110 according to the second media format, at step 410. However, when the power supply level of the second communication device 110 falls below the second predetermined threshold, the media manager 222 optionally re-routes the information to a media output device other than the second communication device 110, at step 412.

The alternate media output device can be external to the first communication device (e.g., a third communication device) or may form part of the first communication device 104. For example, when the alternate media output device is external to the first communication device 104, the alternate media output device may be another wireless headset 110, a wireless earpiece (not shown), a wireless speaker (not shown), a wireless automobile adapter 108, an automobile video display headrest, a video conferencing terminal, a wireless video monitor, a wired video monitor, a computer system, a set top box, a television, or the like. On the other hand, when the alternate media output device forms part of the first communication device 104, the alternate media output device may be, inter alia, an audio jack 236 for an externally connectable earpiece, an accessory connector interface 234, the handset speaker 218, the handset earpiece 238, or the handset display 212.

Alternatively, the media output destination may be a predetermined "default" location, or be selected according to a media output priority listing 240, which listing may be stored in a memory (e.g., the data memory 230) of the first communication device 104. For example, in one embodiment in which the first communication device is a wireless phone, the user can set a priority for outputting the media signal in a user preference section of the phone's setup menu. A typical user may have several paths for the media output. For example, output options for routing the media (e.g., audio or video)

may include the mobile phone earpiece 238, the mobile phone speaker 218, the mobile phone display 212, a wireless headset 110, a wireless automobile adapter 108, and an automobile audio device 106 connected to the mobile phone's accessory connector interface 234 via a car-kit. The user may order his/her preferences as follows:

1. Wireless headset;
2. Wired automobile kit;
3. Wireless automobile adapter;
4. Phone's speaker; and
5. Phone's earpiece.

When an output device on the user's priority list 240 is not physically present (e.g., the user is not in his/her car, so there is no wired automobile kit or wireless automobile adapter), the controller/processor 204 determines that the absent output device is unavailable and does not attempt to route the output media signal to the absent audio output device. In this case, if the monitored operating characteristic level of the second communication device's power supply drops below the threshold allowed for audio or video playback, the media manager 222 re-routes the audio information or video information, as applicable, to the next highest priority audio or video output device on the preferred list 240. Alternatively, the media manager 222 may prompt the user of the first communication device 104 to enter a preferred media output device destination from, for example, a listing of available output devices. In this case, upon receiving the preferred output device preference from the user, the media manager 222 outputs the media information to the output device identified by the user's media output device preference. Additionally, when the destination of the transmitted information is switched to an alternate media output device, haptic (e.g., having the communication device vibrate), visual or audible feedback may be provided to the user to inform the user of the switch. One of ordinary skill in the art will readily recognize that the foregoing operations of the present invention, which have been detailed primarily with respect to the distribution of audio information, may be applied equally well to distributing video signals between communication devices.

Figure 5:
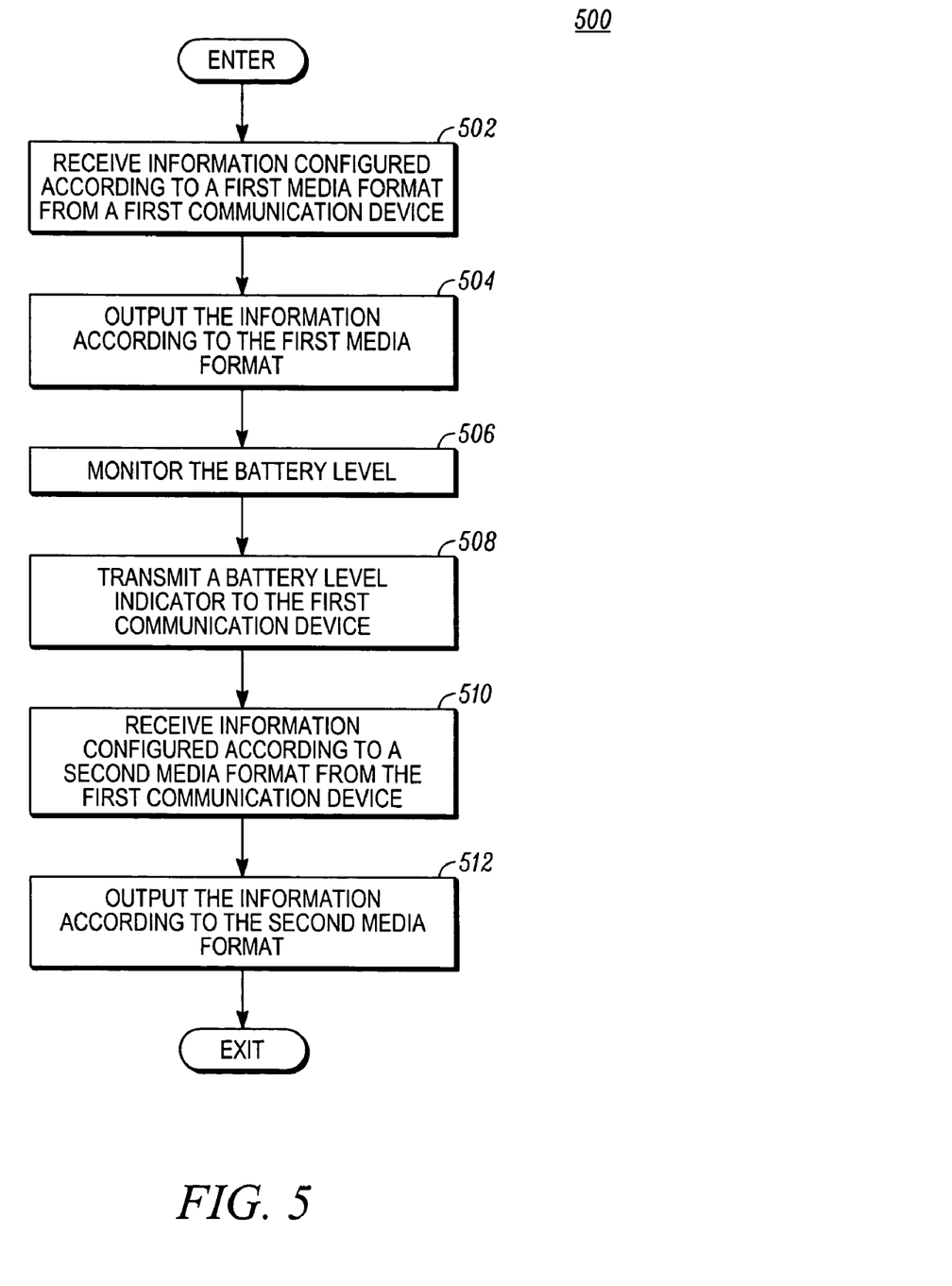
FIG. 5 is an operational flow diagram illustrating a method for distributing information signals in a communication system, in accordance with another exemplary embodiment of the present invention.

Referring to FIG. 5, an exemplary method of operation is discussed from the perspective of a second communication device 110 (e.g., a wireless headset). In FIG. 5, the second communication device 110 is identified as the wireless headset or WL headset in reference to this exemplary embodiment. Beginning in step 502, the second communication device 110 receives a wireless signal containing media information configured according to a first media format from a first communication device 104 (e.g., a mobile telephone). In one embodiment, the first media format may be a Bluetooth A2DP stereo profile; however, any high quality audio or video encoding format may be alternatively used. The second communication device 110 outputs media information to the speakers 306 or video controller 211/display screen 212, as applicable, of the second communication device 110 according to the first media format, at step 504.

Next, the power supply monitoring circuitry 320 monitors a characteristic (e.g., battery voltage level) of the second communication device's depletable power supply 318, at step 506, and transmits data representing the monitored characteristic (e.g., an actual battery voltage level or a battery voltage level indicator) to the first communication device 104, at step 508. While the foregoing discussion has focused on the monitoring of a battery's output voltage, the power supply circuitry 320 may alternatively or additionally monitor any other operating characteristic (e.g., output power, current, energy, discharge rate, etc.) of the depletable power supply 318 for the second communication device 110.

In the event that the first communication device 104 determines, based on receipt of the power supply monitoring data, that the monitored operating characteristic of the second communication device's power supply has fallen below a predetermined threshold, the first communication device 104 changes the output media format to a second media format that preferably requires less power to be consumed by the second communication device's power supply 318 than does the first media format (e.g., use of the Bluetooth SCO mono format results in less power consumption than does use of the Bluetooth A2DP stereo format). The first communication device 104 then continues sending wireless information signals to the second communication device 110 according to the new media format. The second communication device 110 automatically receives the wireless signal containing the media information configured according to the second media format, at step 510. The second communication device 110 then outputs the information contained in the wireless signal to its speakers 306 or video controller 211/display screen 212, as applicable, using the second media format, at step 512.

Figure 6:
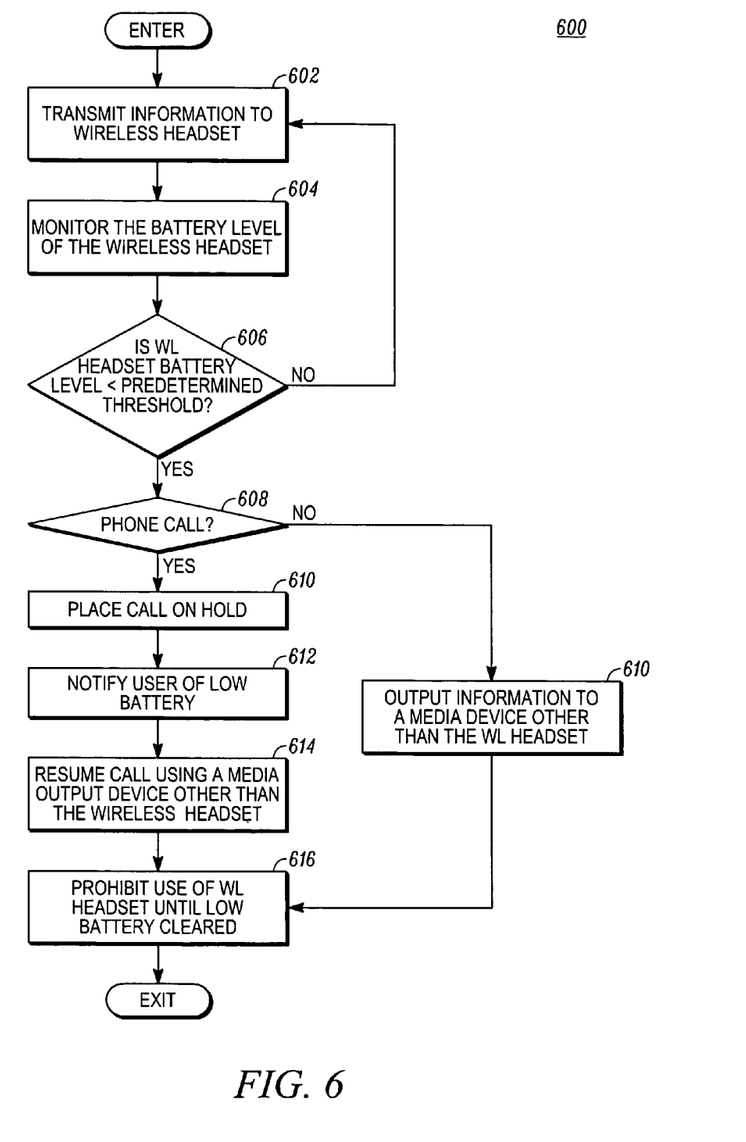
FIG. 6 is an operational flow diagram illustrating a method for managing information signal distribution in a communication system in accordance with yet another exemplary embodiment of the present invention.

FIG. 6 illustrates another exemplary operational flow diagram 600 of logic steps executed to manage information signal distribution in the communication system of FIG. 1, according to an alternative embodiment of the present invention. In this embodiment, the media manager 222 of a first communication device 104 is configured to stop outputting media information to a first media output device and begin outputting the information to an alternate media output device in the event that the level of a monitored operating characteristic (e.g., output power, voltage, current, energy, etc.) of a depletable power supply for a second communication device 110 falls below a predetermined threshold. Beginning at step 602, the first communication device 104 (e.g., wireless phone) transmits media information encoded as data packets in a wireless data transmission to a second communication device 110 (e.g., wireless headset). Power supply circuitry 320 of the second communication device 110 monitors an operating characteristic (e.g., power supply output voltage) of the depletable power supply 318, at step 604, in the manner described above in step 506 of logic flow diagram 500. While the monitored operating characteristic of the second communication device's power supply 318 is above a predetermined threshold, the first communication device 104 continues to transmit media information according to its normal operation. However, when the level of the monitored operating characteristic of the second communication device's power supply 318 falls below the predetermined threshold, at step 606, the media manager 222 determines whether the first communication device 104 is presently engaged in a phone call, at step 608. If the first communication device 104 is in a phone call, the media manager 222 places the call on hold, at step 610, notifies the user of the low battery voltage or other degraded power supply condition, at step 612, then resumes the call using a media output device other than the second communication device 110, at step 614. As discussed above, the alternate media output device may be a default device, chosen from a media output priority listing 240, or the selection of the alternate media output device may be entered by the user in response to a prompt. Finally, the media manager 222 prohibits use of the second communication device 110 until a time when the degraded power supply condition has been cleared (e.g., the battery level has returned to its fully charged condition or is otherwise above the predetermined threshold). The media output device to which the media information is re-routed in this case may form part of the first communication device 104 (e.g., be an internal speaker, earpiece, or display, as appropriate) or be separate from both the first communication device 104 and the second communication device 110 (e.g., be a remote speaker, video terminal, or other device, as appropriate).

However, if the first communication device 104 is not currently in a phone call, at step 608, then the media manager 222 changes the output destination of the media information to a media output device other than the second communication device 110, at step 610, and prohibits further use of the second communication device 110 until a time when the degraded power supply condition has been cleared, at step 616.

As described above, the present invention encompasses a method for managing and distributing information between two or more communication devices based on the operating characteristics of a depletable power supply used in one of the communication devices. With this invention, a wireless communication device communicating audio information to a wireless headset may extend the battery life of the wireless headset by switching audio formats or seamlessly transferring audio destined for the wireless headset to another output device when the battery level has reached a degraded operating point, but prior to the battery actually dying. Although there may be some quality degradation in received audio when switching to a lower power consumption audio profile (e.g., when switching from a Bluetooth A2DP stereo format to a Bluetooth SCO mono format), users will benefit from longer use of their wireless headsets.

Additionally, in an exemplary embodiment where a communication system is streaming video to remote video devices, such as a video teleconferencing monitor distributing video to a video monitor or a video server streaming video files to a portable video player, the streamed video can be seamlessly transferred to an alternate video device so that video playback is resumed with minimal interruption when a video device's power supply reaches a critical level.

In the foregoing specification, the present invention has been described with reference to specific embodiments. However, one of ordinary skill in the art will appreciate that various modifications and changes may be made without departing from the spirit and scope of the present invention as set forth in the appended claims. For example, the present invention is applicable for managing the distribution of any type of media information between any two communication devices, whether wired, wireless, or a combination thereof, provided that at least one of the communication devices includes a depletable power source or supply. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

What is claimed is:

1. A method for managing information signal distribution in a communication system that includes a first communication device and a second communication device, the second communication device receiving power from a depletable power supply, the method comprising:
   transmitting at least one wireless signal from the first communication device to the second communication device, the at least one wireless signal including information configured according to a first media format;
   monitoring a level of at least one operating characteristic of the depletable power supply; and
   outputting the information from the first communication device according to a second media format in the event that the level of the at least one operating characteristic is less than a first predetermined threshold.

2. The method of claim 1, wherein the step of outputting the information comprises:
   transmitting at least a second wireless signal from the first communication device to the second communication device, the at least a second wireless signal including information configured according to the second media format.

3. The method of claim 1, further comprising:
   monitoring a battery level for the first communication device; and
   outputting the information from the first communication device according to the second media format in the event that the battery level for the first communication device is less than a second predetermined threshold.

4. The method of claim 1, wherein the step of outputting the information comprises:
   outputting the information from the first communication device to a media output device other than the second communication device according to the second media format.

5. The method of claim 4, wherein the media output device fauns part of the first communication device.

6. The method of claim 1, further comprising:
   outputting the information from the first communication device to a media output device other than the second communication device in the event that the level of the at least one operating characteristic is less than a second predetermined threshold.

7. The method of claim 6, wherein the media output device forms part of the first communication device.

8. The method of claim 1, wherein:
   the first media format comprises a Bluetooth Advanced Audio Distribution Profile (A2DP) stereo format; and
   the second media format comprises a Bluetooth Synchronous Connection Oriented (SCO) mono format.

9. The method of claim 1, wherein the second communication device is at least one of a wireless headset, a wireless earpiece, a wireless video monitor, and a wireless speaker.

10. A method for managing information signal distribution in a communication system that includes a first communication device and a second communication device, the second communication device receiving power from a depletable power supply, the method comprising:
    transmitting at least one wireless signal from the first communication device to the second communication device, the at least one wireless signal including media information;
    monitoring a level of at least one operating characteristic of the depletable power supply for the second communication device; and
    outputting the media information from the first communication device to a media output device other than the second communication device in the event that the level of the at least one operating characteristic is less than a predetermined threshold.

11. The method of claim 10, wherein the media output device forms part of the first communication device.

12. The method of claim 10, wherein the media output device is one of a wireless headset, a wireless speaker, a wireless earpiece, a wireless automobile adapter, a mobile telephone speaker, a mobile telephone audio jack, a mobile telephone earpiece, a mobile telephone accessory connector, an automobile video display headrest, a video conferencing terminal, a wireless video monitor, a computer system, and a television.

13. The method of claim 10, further comprising:
providing haptic feedback to a user of the first communication device to inform the user that the media information is no longer being output by the second communication device.

14. The method of claim 10, further comprising:
selecting the media output device according to a priority listing.

15. The method of claim 10, further comprising:
prompting a user of the first communication device to enter a media output device preference;
receiving the media output device preference from the user; and
outputting the media information from the first communication device to the media output device based on the media output device preference.

16. The method of claim 10, further comprising:
prior to outputting the media information to the media output device, determining whether the first communication device is engaged in a phone call, wherein the phone call includes the media information,
placing the phone call on hold, and
notifying a user of the first communication device that the level of the at least one operating characteristic of the second communication device is less than the predetermined threshold; and
wherein outputting the media information to the media output device includes resuming the phone call using the media output device.

17. The method of claim 16, further comprising:
prohibiting use of the second communication device until the level of the at least one operating characteristic of the second communication device is above the predetermined threshold.

18. A method for distributing information signals in a communication system that includes a first communication device and a second communication device, the second communication device receiving power from a depletable power supply, the method comprising:
receiving, at the second communication device, at least one wireless signal from the first communication device, the at least one wireless signal including information configured according to a first media format;
outputting the information at the second communication device according to the first media format;
monitoring a level of at least one operating characteristic for the depletable power supply;
transmitting a level indicator for the at least one operating characteristic to the first communication device;
receiving the information from the first communication device according to a second media format in the event that the level of the at least one operating characteristic is less than a predetermined threshold; and
outputting the information at the second communication device according to the second media format.

19. The method of claim 18, wherein the level indicator for the at least one operating characteristic is transmitted only in the event that the level of the at least one operating characteristic is less than the predetermined threshold.

20. The method of claim 18, wherein the level indicator for the at least one operating characteristic is transmitted at predetermined intervals.

21. A method for managing information signal distribution in a communication system that includes a first communication device and a second communication device, the second communication device receiving power from a depletable power supply, the method comprising:
transmitting at least one wireless signal from the first communication device to the second communication device, the at least one wireless signal including information configured according to a first media format;
outputting the information at the second communication device according to the first media format;
monitoring a level of at least one operating characteristic of the depletable power supply; and
outputting the information from the first communication device according to a second media format in the event that the level of the at least one operating characteristic is less than a predetermined threshold.

* * * * *